United States Patent [19]

Schiller

[11] Patent Number: 4,732,600
[45] Date of Patent: Mar. 22, 1988

[54] APPARATUS FOR FILLING NOTCHES PROVIDED IN A WORKPIECE WITH A SOFT FILLER MATERIAL

[75] Inventor: Edward Schiller, Sunnyvale, Calif.

[73] Assignee: Ampex Corporation, Redwood City, Calif.

[21] Appl. No.: 863,282

[22] Filed: May 15, 1986

Related U.S. Application Data

[62] Division of Ser. No. 464,844, Feb. 8, 1983, Pat. No. 4,611,259.

[51] Int. Cl.$^4$ .............................................. C03C 27/02
[52] U.S. Cl. ........................................ 65/154; 29/603; 65/59.7; 65/155; 425/357; 425/517
[58] Field of Search .................... 29/603; 65/59.1, 305, 65/59.7, 154, 155, 18.1; 269/903; 264/272.19, 259, 104, 261, 265; 156/581; 100/295; 425/233, 352, 358, 357, 406, 500, 517, 519, 520; 249/83, 94, 96

[56] References Cited

U.S. PATENT DOCUMENTS

| | | | |
|---|---|---|---|
| 4,247,492 | 1/1981 | Neefe | 425/808 |
| 4,414,028 | 11/1983 | Inoue | 425/330 |
| 4,464,326 | 8/1984 | Nishihira | 264/259 |
| 4,540,423 | 9/1985 | Fuchs | 29/603 |

Primary Examiner—Jay H. Woo
Assistant Examiner—J. Fortenberry
Attorney, Agent, or Firm—Elizabeth E. Strnad; Richard P. Lange

[57] ABSTRACT

An apparatus is described for filling notches in a notched workpiece with a soft filler material having a viscosity similar to glasses. The apparatus has a bottom portion which receives the notched workpiece and a top portion. The top portion has a lower surface adapted to apply a concentrated pressure in the direction of the bottom portion to enhance flow of the soft filler material into the notches when that material is inserted between the assembled top and bottom portions.

15 Claims, 29 Drawing Figures

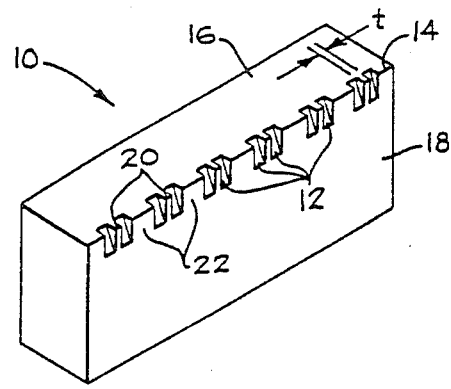
FIG_1
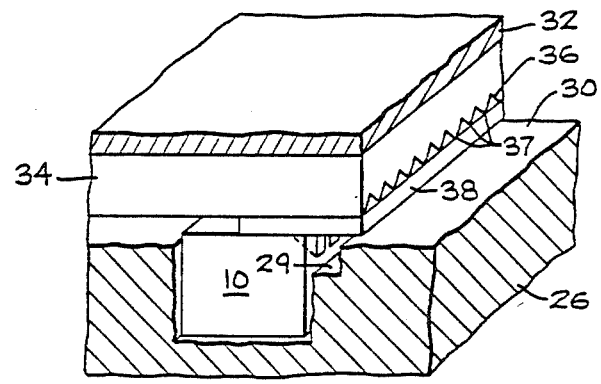
FIG_2A
FIG_3
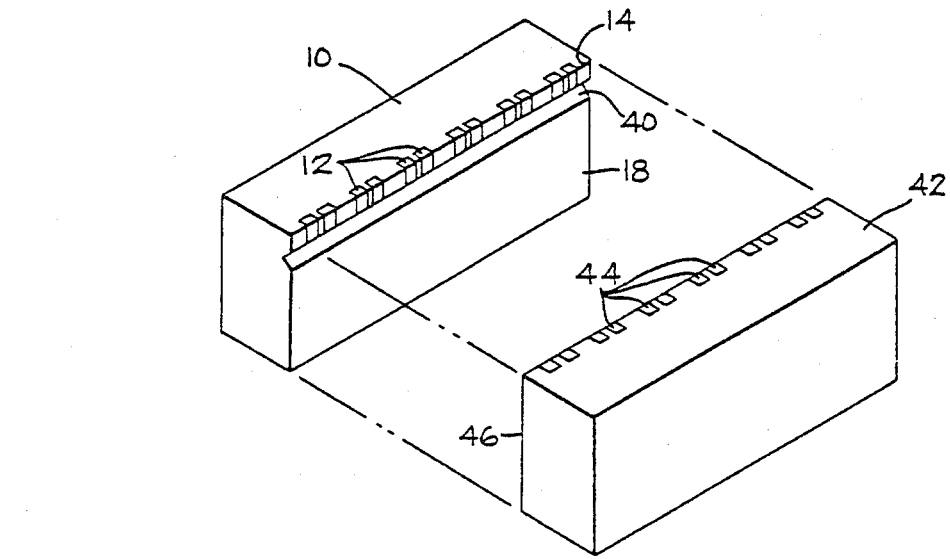
FIG_4

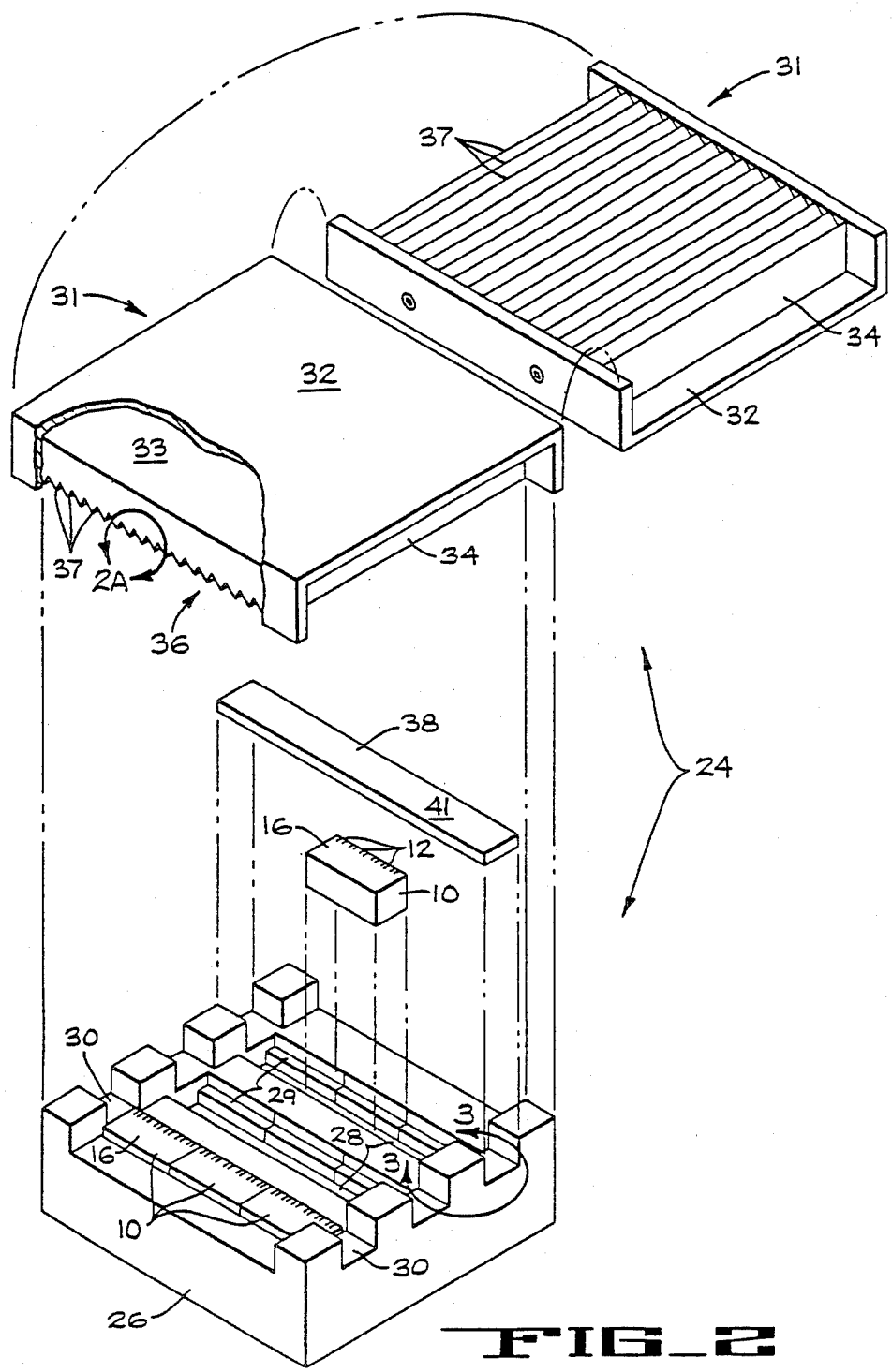

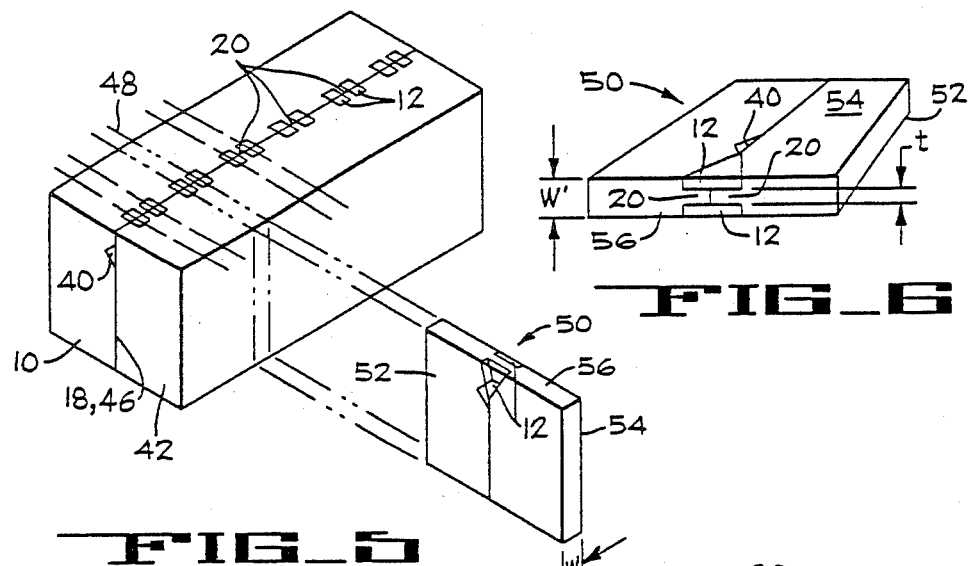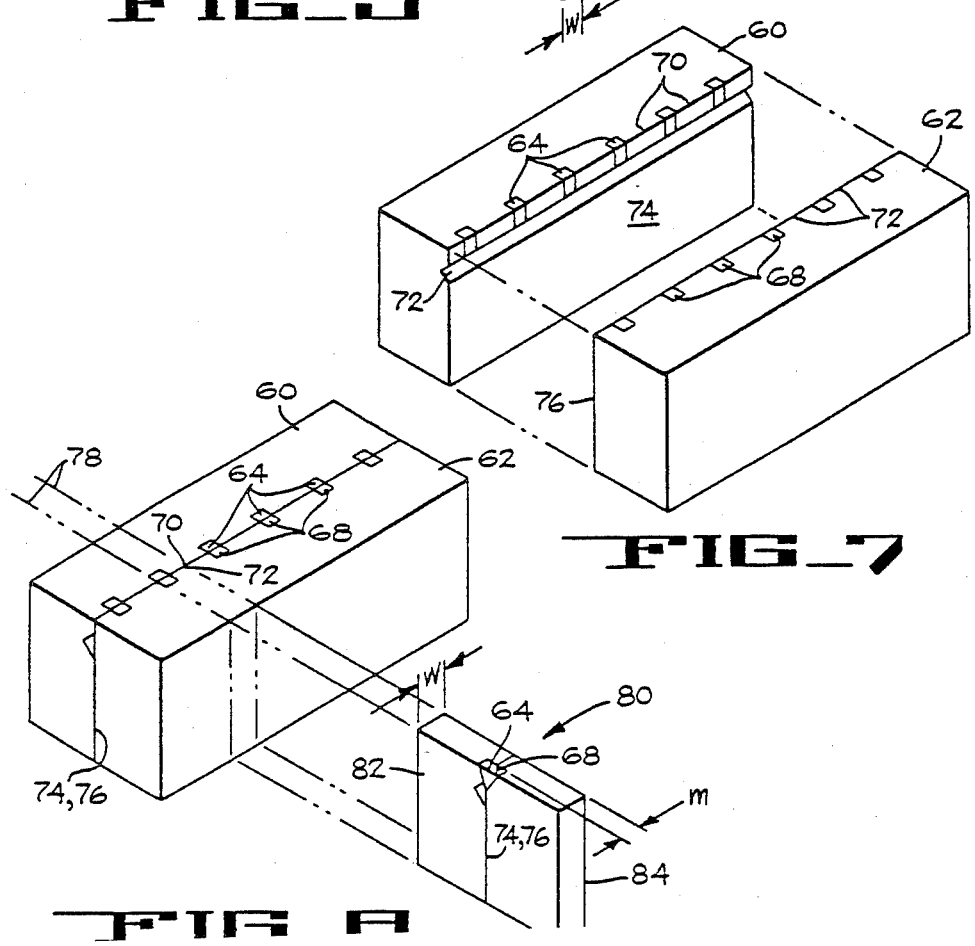

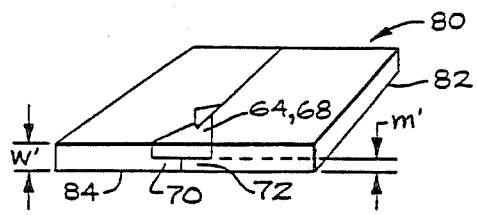
FIG_9
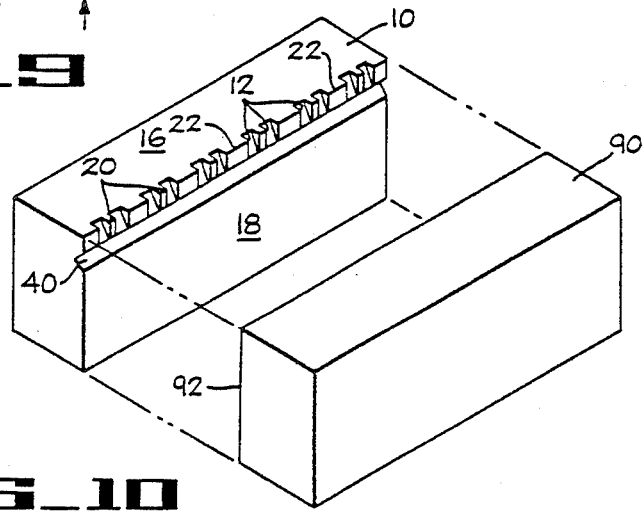
FIG_10
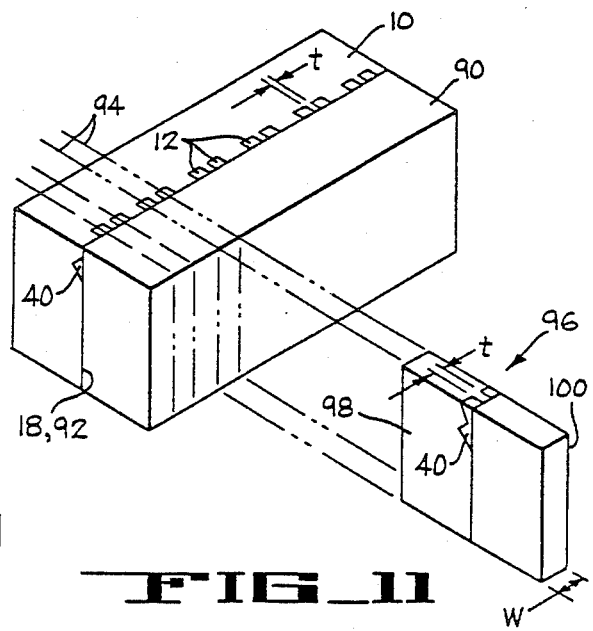
FIG_11
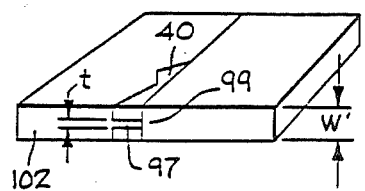
FIG_12

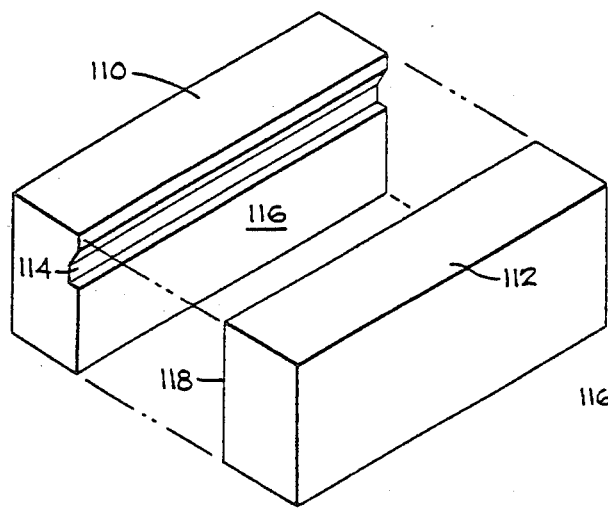
FIG_13
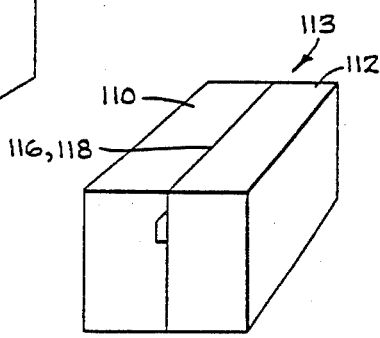
FIG_14
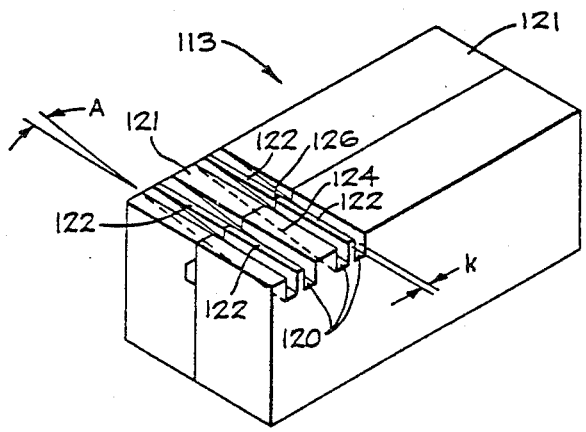
FIG_15

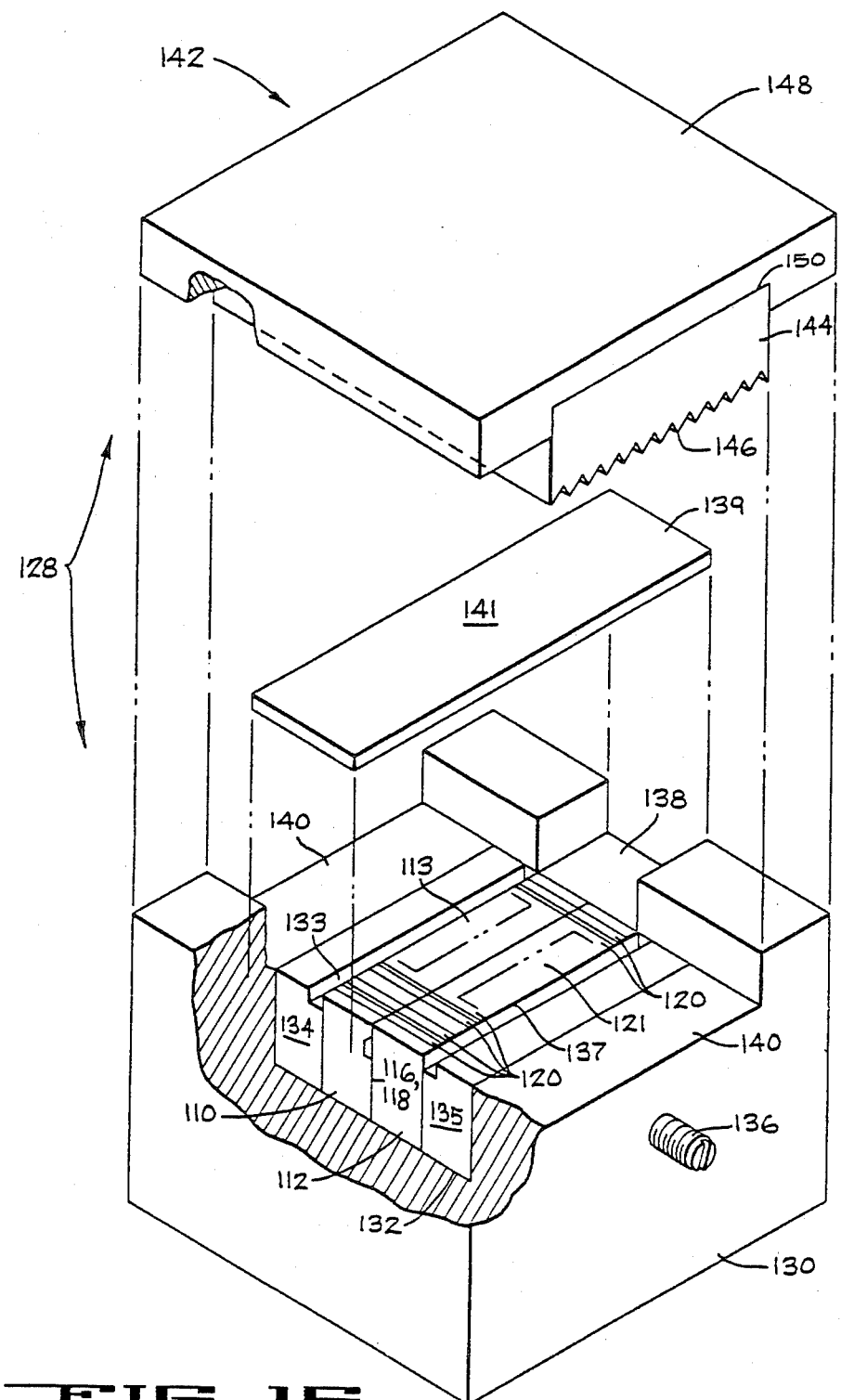
FIG_16

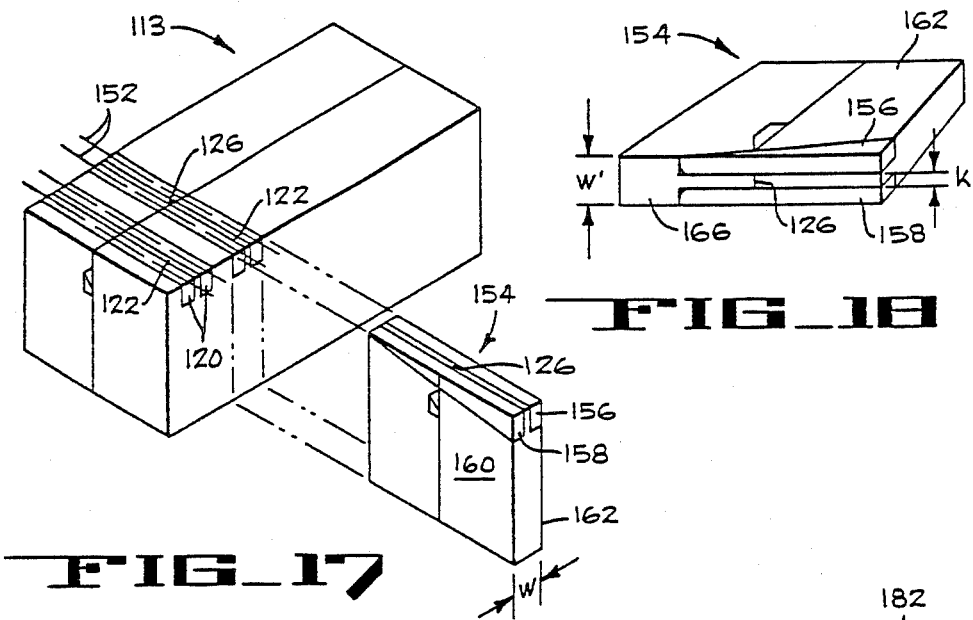
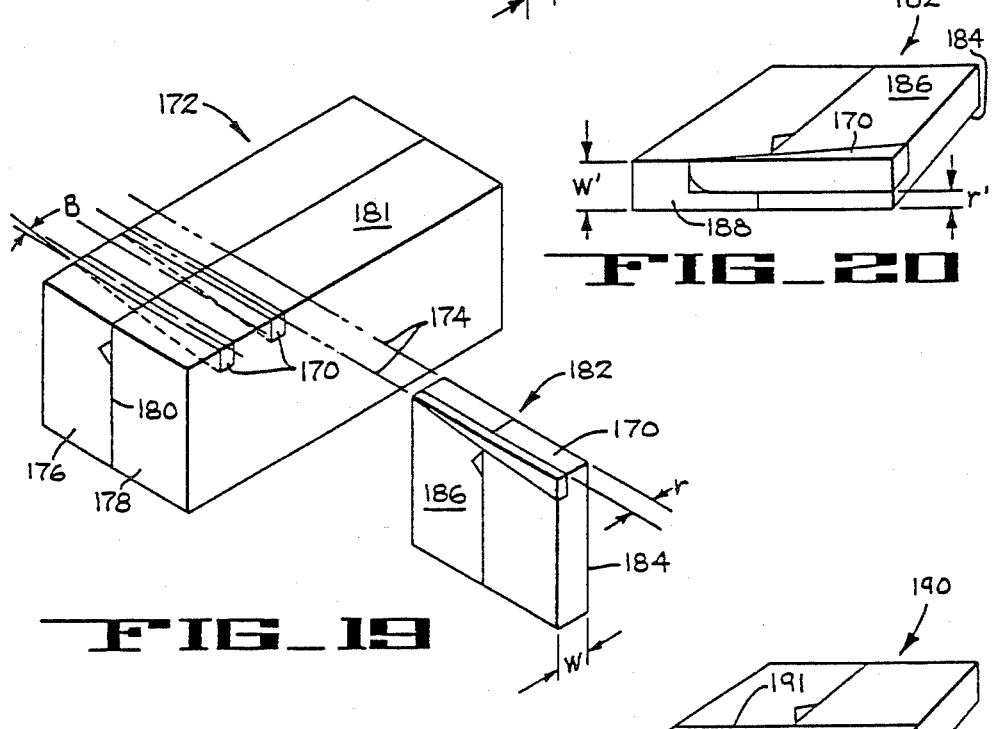
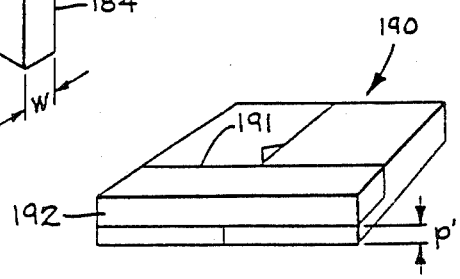

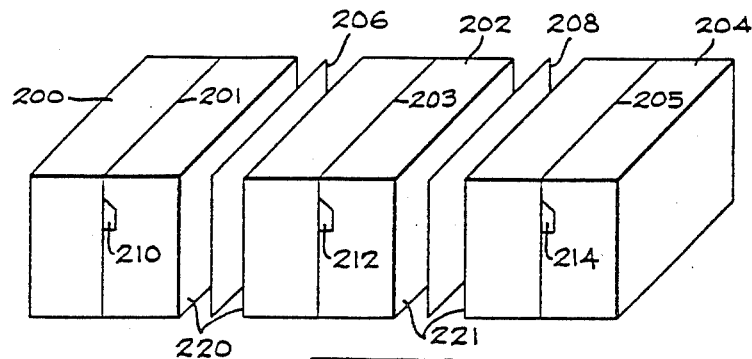
FIG_22
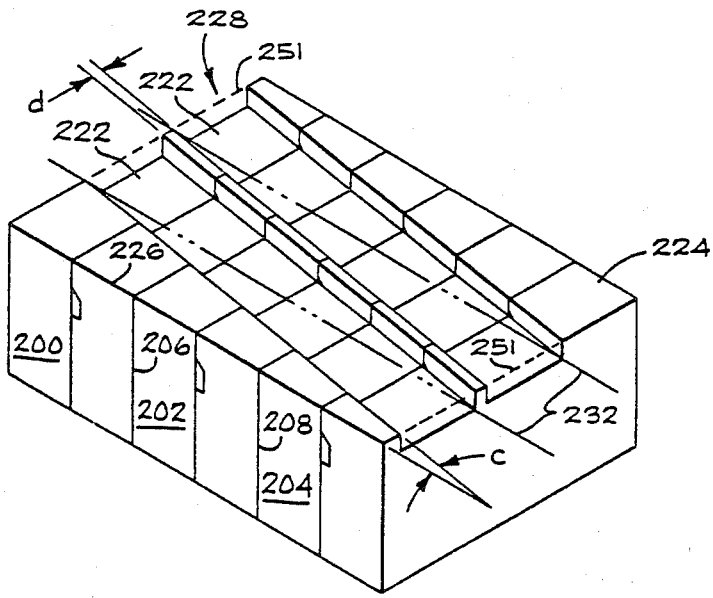
FIG_23
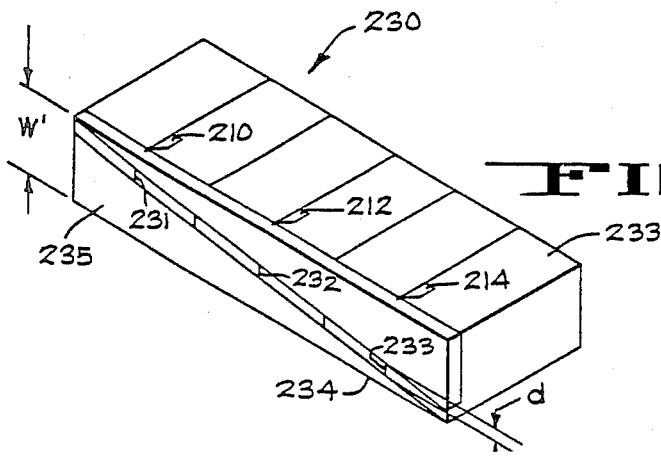
FIG_24

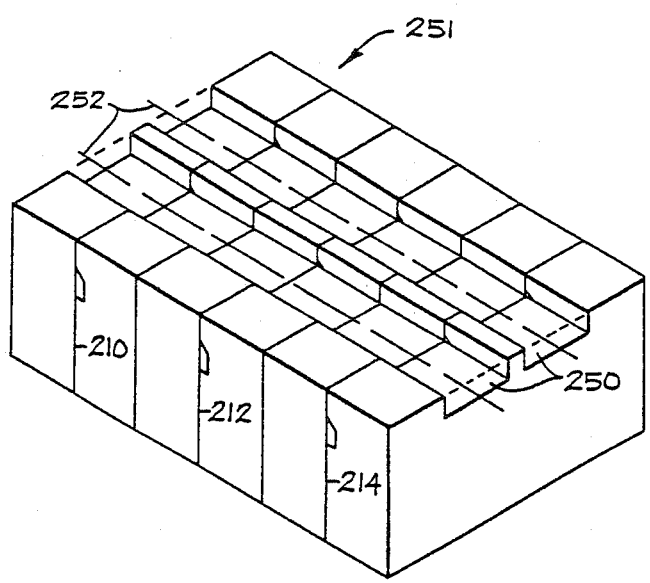
FIG_25
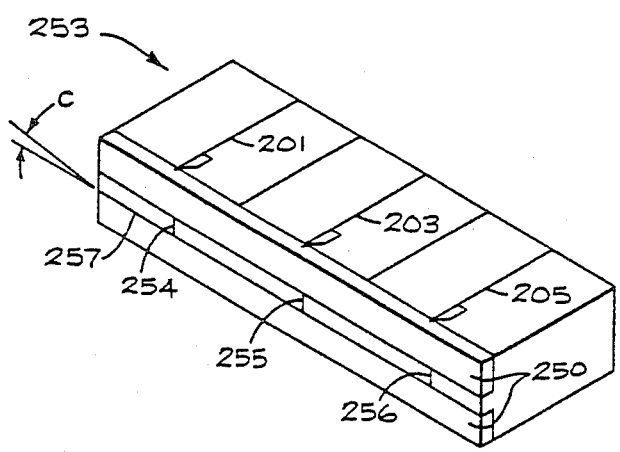
FIG_26

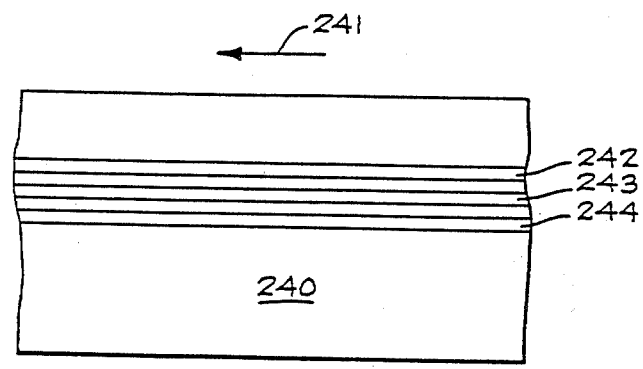
FIG_27
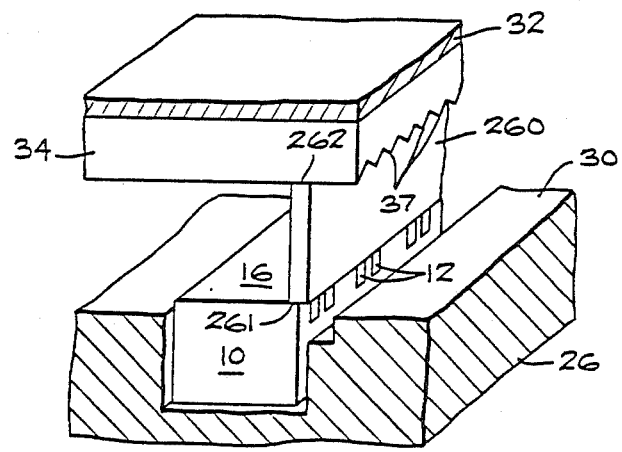
FIG_28

APPARATUS FOR FILLING NOTCHES PROVIDED IN A WORKPIECE WITH A SOFT FILLER MATERIAL

This is a divisional of co-pending application Ser. No. 464,844, filed on Feb. 8, 1983, now U.S. Pat. No. 4,611,259, issued on Sept. 9, 1986.

BACKGROUND OF THE INVENTION

The invention relates to magnetic transducers for narrow track recording and/or playback and it is particularly useful with respect to transducers made of hard, brittle magnetic materials.

Magnetic transducers having notched poles to reduce recording track width are well known in the art. The notches are generally filled with a suitable nonmagnetic material, such as glass to avoid chipping and granular pullouts of the magnetic material in the transducing gap area.

One example of prior art magnetic transducers having protective glass pockets at the transducing gap and a method of manufacturing such transducers is described in U.S. Pat. Nos. 3,813,693 and 3,845,550 to B. Gooch and E. Schiller, which patents are commonly assigned to Ampex Corporation and are hereby incorporated by reference in this patent application. In these prior art transducers glass bonding of the transducing gaps and filling the notches with glass to obtain the protective pockets is provided simultaneously during a single glass bonding operation. In these and other well known glass filled transducers the glass is generally selected from a group referred to as low temperature glasses having a melting temperature generally below 600° C. These glasses have a disadvantage when utilized in transducers made of hard, brittle magnetic material, such as ferrite, of having a substantially higher wear rate relative to that of the magnetic material, resulting in differential wear of the transducer. Consequently, in the above indicated applications it is desirable to utilize so called high temperature glasses which have compatible mechanical properties, including wear rate with the magnetic material. However the melting temperature of high temperature glasses, which is generally around 900° C., exceeds a critical temperature at which the permeability and other magnetic characteristics of the magnetic material are impaired. It is a well known undesirable phenomenon that when these glasses into ferrite material at a temperature above their melting point, diffusion of glass into the ferrite takes place. The latter phenomenon is irreversible and therefore transducer efficiency is thereby permanently reduced.

On the other hand, low temperature glasses are known to have a relatively high lead content and when heated to their melting temperature they may chemically react with the particular magnetic material thereby impairing its magnetic properties.

In addition to the above-indicated disadvantages of prior art it is well known that higher temperatures increase undesirable occurence of gas bubbles in the glass. Therefore it would be desirable to fill magnetic transducers with glass or similar nonmagnetic material at lower temperatures, that is at higher viscosity of the material to reduce the occurence of gas bubble therein.

OBJECTS OF THE INVENTION

Accordingly, it is an object of this invention to provide a magnetic transducer and manufacturing method wherein track width reducing notches are filled with a nonmagnetic material at a temperature below the melting temperature thereof to obtain a transducer whose permeability and other magnetic properties are not impaired.

It is a further object of the invention to provide a transducer and a method of manufacturing a transducer which is notched to reduce the track width and where the notch is filled at a relatively low temperature with a nonmagnetic material having a relatively high melting temperature.

It is still another object of the invention to provide a fixture utilized in the process of filling the notched transducer with the above-indicated nonmagnetic material in accordance with the method of the present invention.

It is an additional object of the invention to provide a magnetic transducer having track width reducing notches filled with a nonmagnetic material and wherein a misalignment between confronting magnetic poles defining a transducing gap width is eliminated and to provide a method of making such transducer.

It is a further object to provide a magnetic transducer and manufacturing method having the above indicated features and in which transducer the content of gas filled bubbles is substantially reduced.

It is a still further object to provide a transducer and method having the above indicated features and suitable for economical production.

These and other objects, features and advantages of the invention will become apparent from the following description and accompanying drawings.

BRIEF DESCRIPTION OF THE DRAWINGS

FIGS. 1 to 6 schematically show method steps utilized in manufacturing a preferred embodiment in accordance with the present invention herein referred to as "prefilled".

FIGS. 7 to 12 show alternative method steps utilized to obtain further prefilled transducer embodiments of the invention.

FIGS. 13 to 18 show method steps utilized to obtain a further preferred embodiment of the present invention, herein referred to as "postfilled."

FIGS. 19 to 21 show alternative method steps for obtaining further postfilled transducer embodiments of the invention.

FIGS. 22 to 26 show further alternative method steps utilized to obtain various postfilled multichannel transducer embodiments of the present invention.

FIG. 27 shows recording tracks obtained on a magnetic tape by the multichannel embodiments of FIGS. 22 to 26.

FIG. 28 shows an alternative method step to that shown in FIG. 3.

DETAILED DESCRIPTION

The various preferred and alternative embodiments in accordance with the present invention will be described in the following detailed description. Examples of a method and transducer embodiments further referred to as "prefilling" or "prefilled" respectively are shown in FIGS. 1 to 12 in the attached drawings. In these transducers the notches are filled with a nonmagnetic material prior to bonding the transducing gap. FIGS. 13 to 27 show a method and transducer embodiments referred to as "postfilling" or "postfilled" respectively, since the transducing gaps therein are first bonded and the notches are filled with a suitable nonmagnetic material thereafter.

With reference to FIG. 1 a block 10 of magnetic material, for example ferrite, is prepared for example by cutting from a stock of ferrite material in a manner well known in the art. The size of the block is for example 0.125×0.062×0.3 inches. A plurality of spaced parallel notches 12 is cut along a longitudinal edge 14 into block 10, intercepting adjacent perpendicular surfaces 16 and 18 thereof. Notches 12 are cut in a well known manner, for example utilizing an abrasive wheel (not shown) as it is described for example in the above referenced U.S. Pat. Nos. 3,813,643 and 3,845,550. The notches 12 define magnetic poles 20 therebetween having a precise width t in the direction of edge 14 to define a desired transducing gap width, also referred to as track width of the resulting transducer structure as it will follow from further description. In the preferred embodiment of FIG. 1 respective pairs of notches 12 are spaced from each other at a distance greater than t, thereby forming lands 22. Lands 22 serve to provide sufficient space for accommodating a cutting tool such as a saw blade utilized for slicing individual transducers from block 10 in a well known manner.

FIG. 2 shows a subsequent method step of glass filling the notches 12 of block 10 in accordance with the invention. With further reference to FIG. 2, it shows an exploded view of a preferred embodiment of fixture 24 utilized for the process of glass filling the notches 12. Fixture 24 is made preferably of graphite and/or stainless steel or other suitable material which withstands temperatures applied thereto during the following manufacturing process. Fixture 24 is preferably made by machining, for example utilizing a milling machine and employing machining techniques well known in the art. Fixture 24 has a bottom portion 26 and a top portion 31 made to fit over the bottom portion 26 when assembled therewith. Portion 26 is provided with a first set of parallel grooves 28 to snuggly accommodate a number of notched blocks 10. A second set of parallel grooves 30 is provided to accommodate glass strips 38 preferably made of a high temperature glass, for example No. 9025, made by Corning Glass Works. Along a side wall of each groove 28 a longitudinal recess or step 29 is formed to provide space to accomodate flow of excess glass during the glass filling process as it will follow from further description.

The top portion 31 of fixture 24 comprises a block 34, having a lower surface 36 provided with a plurality of parallel longitudinal serrations 37. A weight 32 preferably in the form of a plate extends over an upper surface 33 of block 34 opposite the serrated surface 36. Preferably the weight 32 is evenly distributed over the upper surface 33 of block 34. In the embodiment of FIG. 2 the serrated block 34 is preferably made of graphite and plate 32 of steel. It will be understood that alternatively weight 32 may be applied to block 34 in any other suitable form. For better representation, the top portion 31 of fixture 24 is turned by 180° in FIG. 2 to reveal the serrated surface 36 thereof. It will be understood that the size of the serrations as well as of some other elements in proportion to other elements in the drawings are exaggerated to show details. In the preferred embodiment the longitudinal direction of serrations 37 is parallel with the longitudinal direction of notches 12 when blocks 10 are inserted into the assembled fixture 24.

FIG. 2A shows an enlarged fragmentary view of a portion of serrations 37 indicated by line 2A in FIG. 2. For example, the serrations may have a rectangular cross section, a depth d=0.010 mil and a pitch s=0.025 mil. It will be understood from further description that the number and shape of the above described serrations is not critical when utilized in accordance with the method of the invention and that any other suitable shape, size or number of serrations may be utilized. It has been observed that while just one such serration 37 may be sufficient for example when utilizing relatively short strips of glass 38 over a corresponding short block 10, the process is accelerated when a plurality of serrations is utilized. It is noted however that when other suitable shapes of serrations are utilized, they should have a relatively large ratio between the overall serrated surface area and the discrete areas providing a concentrated pressure or load such as may be obtained by discrete points or lines of contact with the nonmagnetic filling material as it will follow from further disclosure.

With further reference to FIG. 2, one or more notched blocks 10 are inserted into grooves 28 having notches 12 aligned along the stepped side walls 29 and between confronting grooves 30. The top surface 16 of blocks 10 preferably slightly extends above the steps 29 and the bottom of grooves 30 to obtain intimate contact with the glass strip 38 when inserted in grooves 30. To avoid sticking of the glass 38 to fixture 24, prior to inserting blocks 10 and glass strips 38 therein, those glass contacting areas of fixture 24 which are made of stainless steel are preferably coated with a high temperature grease, for example type C-102, manufactured by FEL-PRO Incorporated, and baked at about 400° for about 30 minutes as directed by manufacturer and as well known in the art.

Glass strips 38, preferably 20 mils thick, are then inserted into grooves 30 and the bottom portion 26 is thereafter assembled with the top portion 31 in such a way that the edges of serrations 37 are in contact with the top surface 41 of glasss strips 38, as best shown in the enlarged fragmentary, partially perspective and partially cross sectional view of FIG. 3 taken along line 3 of FIG. 2. The assembled fixture 24 is then placed in an oven, as it is well known in the art, where it is heated above the softening temperature of the glass 38 but below the melting temperature thereof. For example, when utilizing Corning Glass No. 9025 having a softening temperature approximately 650° C. and a melting temperature approximately 950° the temperature of the oven is preferably selected at 750° C. Since the selected temperature is slightly above the deformation point of the glass, the glass becomes tacky but does not flow freely with respect to its relatively low viscosity at the given temperature and consequently it would not flow normally into grooves 12 of blocks 10. The present invention facilitates glass flow at a selected relatively low temperature which is over its softening temperature but below its melting temperature, by applying thereto concentrated pressure at discrete locations as it is described below.

With further reference to the preferred method the weight 32 applied to block 34 urges serrations 37 against the softened surface, of the glass strips 38. The projecting edges of serrations 37 provide discrete locations of concentrated high pressure over the glass surface 41. As a result, glass flow into the notches 12 is enchanced. The notches 12 are thereby filled with the glass while excess glass flows into free areas provided within the fixture 24, such as grooves 29. To reduce glass penetration into grooves 28 and possible sticking of blocks 10 therein it is preferable that grooves 28 be dimensioned to snuggly accommodate blocks 10 therein.

It is seen from the above disclosure that while weight or load 32 applies a relatively low and substantially uniform surface unit pressure on top surface 33 of block 34, a relatively high concentration of load and thus surface unit pressure is obtained at discrete locations along the longitudinal edges of serrations 37. It follows from the foregoing description that by the above-described method step the glass flow is obtained at a relatively low temperature and relatively high viscosity of the glass material. As an example, the overall size of the top portion 31 of FIG. 2 is approximately 2×1.5×0.375 inches and the total weight is approximately 100 grams while the number of serrations utilized is approximately 40 per inch. It will be understood by those skilled in the art that if an overall relatively high surface pressure comparable to that provided by the edges of serrations 37 would be applied to notched ferrite blocks 10, these blocks would suffer mechanical damage.

It is noted that while respective glass and magnetic materials in the specification are given as examples, other suitable materials besides those specifically mentioned may be utilized when making the various embodiments of the invention. For example, instead of utilizing high temperature glasses for filling the notches utilizing the prefilling method, other suitable electrically insulating, nonmagnetic materials, may be utilized having a viscosity and hardness similar to those of glasses. The high and low temperature ranges as indicated in the specification with reference to the described materials may differ when other suitable materials are utilized. It will be understood that the critical temperature at which the magnetic characteristics of the magnetic material may be impaired for example the permeability reduced, as previously indicated, may differ for different magnetic materials. For example when a polycrystalline ferrite is utilized, such as type PS-52B manufactured by Ampex Corporation, the temperature during manufacturing in accordance with the invention should not exceed circa 800° C. while single crystal ferrites generally may withstand higher temperatures.

To provide a more complete disclosure of the step of filling the notches 12 of blocks 10 with a suitable nonmagnetic material as shown in FIGS. 2 and 3, an example is hereby given, in which as strip 38 the above-indicated glass No. 9025 is utilized. After the fixture 24 with blocks 10 and strip 38 inserted therein is assembled as previously described with reference to FIGS. 2 and 3, the fixture 24 is placed in an oven which has a nitrogen atmosphere and a temperature rising to 750° C. for a period of 30 minutes. That temperature is then maintained for additional 30 minutes and thereafter the oven is turned off. After a period of three to four hours when the oven temperature falls to approximately 200° C. the fixture is removed from the oven.

Thereafter blocks 10 are removed from fixture 24 and block 1 is lapped to remove excess glass from the surfaces thereof. With reference to FIG. 4 a longitudinal groove 40 is formed in one block 10 in a well known manner for example by machine grinding, in the direction of edge 14 inwardly of surface 18, immediately below and intercepting the glass filled notches 12. Groove 40 serves to provide winding windows as it is well known in the art and will follow from further description. Surface 18 is then polished to obtain a flatness necessary for a transducing gap plane as well known.

A second block 42 corresponding to block 10 is prepared in the above described manner with the exception of groove 40. A suitable nonmagnetic transducing gap forming material is then deposited at corresponding gap planes 18 and 46 of respective blocks 10, 42, for example Corning Glass No. 9741 utilizing well know vacuum sputtering techniques. The combined thicknesses of the sputtered layers correspond to a desired transducing gap length which in the preferred embodiment may range between 15 and 200 microinches.

Blocks 10, 42 are then assembled as shown in FIGS. 4 and 5 and held together with corresponding transducing gap surfaces 18, 46 abutting and with the corresponding magnetic poles 20 precisely aligned to avoid mismatch. The thusly assembled blocks 10, 42 are held in a suitable holding fixture (not shown) as it is well known in the art, placed in an oven and glass bonded at a temperature approximately 700° C. as directed by the manufacturer of the particular glass utilized.

The bonded blocks 10, 42 are then removed from the holding fixture and subsequently they are sliced into a plurality of individual transducers 50, each having a width w, as indicated by parallel lines 48 in FIG. 5. The slicing operation is performed for example by a diamond saw blade which passes through the glass filled notches, also referred to as pockets 12 at lines 48. The transducing gap width t of each resulting transducer 50, as best shown in FIG. 6 is defined between respective laterally extending pockets 12 at opposite sides of the transducing gap defining poles 20. The transducer 50 is then lapped at opposite parallel planar surfaces 52, 54 to obtain a transducer width w' which has been reduced with respect to width w shown in FIG. 5. Thereafter each transducer 50 may be contoured to obtain a desired contour of the transducer-to-magnetic medium surface 56 and a desired gap depth, respectively as it is well known in the art. To complete each transducer 50, transducing windings (not shown) are wound thereon extending through the winding window 40, in a well know manner.

FIGS. 7 to 9 of the attached drawings show method steps for manufacturing alternative prefilled transducer embodiments of the invention. It will be appreciated that with respect to similarities between the respective method steps utilized to manufacture the various embodiments of the invention only those steps which differ from the previously described ones will be described in detail to avoid repetition. In FIG. 7 two corresponding blocks 60, 62 of magnetic material similar to previously described blocks 10, 42 of FIG. 4 are formed and provided with spaced parallel notches 64, 68 similar to notches 12, 44 in the previously described manner. As different from the embodiment of FIGS. 1 to 6, adjacent notches 64, 68, respectively, are equidistantly spaced from each other, forming a plurality of corresponding lands 70, 72 between them. The thusly formed notches 64, 68 of the corresponding blocks 60, 62 are then filled preferably with a high temperature glass, utilizing the previously described method steps as shown in FIGS. 2 and 3.

After the glass filling step a longitudinal groove 72 is provided in block 60 inwardly of a transducing gap forming surface 74 in a manner similar to forming groove 40 of FIG. 4. It will be understood by those skilled in the art that a second groove (not shown) corresponding to and confronting groove 72 may be provided in block 62, if desired, to obtain additional space for transducing windings. Following deposition of transducing gap forming material on surfaces 74, 76 in a known manner blocks 60, 62 are assembled with these respective surfaces 74, 76 abutting as it is shown in FIGS. 7 and 8. When assembling blocks 60, 62 it is necessary to precisely align the glass filled notches or pockets 64, 68 to avoid mismatch of the resulting confronting poles 70, 72 defining the track width m which on one side is defined by the confronting nonmagnetic pockets 64, 68, as shown in FIGS. 8 and 9.

The thusly bonded blocks 60, 62 are sliced along parallel lines 78 as shown in FIG. 8 to obtain a plurality of individual transducers in a manner similar to that previously described with reference to FIG. 5. However it is different from the embodiment of FIG. 5 that only every other cut 78 extends through the glass confronting filled pockets, 64, 68 while the interspaced cuts extend through the confronting lands 70, 72 which define the magnetic poles of the transducer. Consequently each resulting transducer 80 has its transducing gap width m defined by abutting glass pockets 64, 68 on one side and by the lateral surface 84 of the transducer 80 on the other side. Therefore in this embodiment the resulting transducing gap width m may be controlled by the final lapping step at lateral surface 84.

An example of another alternative embodiment of the invention utilizing the prefilling method will be described now with reference to FIGS. 10 to 12. FIG. 10 shows two corresponding blocks 10, 90 of magnetic material. Block 10 is prepared in a manner similar to that previously described with reference to FIGS. 1 to 4, that is, notched, glass filled and provided with a longitudinal groove in accordance with the above disclosed method steps. A second block 90 preferably of the same magnetic material as block 10 is prepared, having overall dimensions corresponding to those of block 10, but notches or grooves are not provided therein. The corresponding blocks 10, 90 are lapped and polished at confronting surfaces 18, 92 to obtain respective transducing gap planes and subsequently a suitable transducing gap material is deposited thereon as it has been described in the foregoing disclosure. The blocks 10, 90 are then assembled and held together with surfaces 18, 92 abutting and subsequently glass bonded as described before. The thusly obtained composite block 10, 90 is then sliced through the glass filled notches 12 as indicated by parallel lines 94 in FIG. 11 to obtain a pluralilty of individual transducers 96, in the previously disclosed manner.

While the transducing gap width or track width t of transducer 96 is defined between two adjacent glass pockets 12 provided in block 10 as above described with reference to FIG. 1, the embodiment of FIGS. 10 to 12 has the advantage that the confronting magnetic poles 97, 99 of blocks 10, 90 do not need to be precisely aligned at the abutting surfaces 18, 92 to obtain precise alignment of confronting magnetic poles 97, 99 as shown in FIG. 12.

The thusly sliced transducers 96 are then lapped at opposite lateral planar surfaces 98, 100 to reduce the width w of the originally sliced transducer core to a desired transducer width w' and they are subsequently contoured to obtain a desired transducer-to-medium surface 102 as well known.

It is seen from the foregoing description that the transducer embodiments manufactured utilizing the prefilling method have their transducing gaps formed after the track width reducing notches have been filled. Consequently, they have the advantage of not causing possible damage to the glass bonded transducing gaps during the heat requiring notch filling steps. At the same time the latter transduercs have the disadvantage of a possible misalignment between transducing pole pieces when the confronting notched blocks are not precisely aligned. The latter disadvantage is eliminated by the postfilling method and resulting transducer structures of the present invention as it will be described below with reference to FIGS. 13 to 22, respectively.

FIG. 13 shows two corresponding blocks 110, 112 of magnetic material, for example ferrite, which are prepared in a similar manner as previously described with respect to block 90 of FIG. 10. A longitudinal groove 114 is formed at least in one block 110 as well known to obtain winding windows. A layer of suitable nonmagnetic transducing gap forming material, for example glass is provided on smoothly lapped corresponding confronting surfaces 116, 118, for example by a well known deposition process, preferably sputtering. For example Corning Glass No. 9741 is utilized which has a bonding temperature of 700° C. The corresponding blocks 110, 112 are then assembled with confronting surfaces 116, 118 abutting as shown in FIG. 1 and bonded together utilizing known techniques. A plurality of spaced parallel notches or grooves 120 is then cut into the resulting bonded blocks 113 inwardly of an upper surface 121 thereof, preferably having a depth varying at a selected chamfer angle A preferably less than 3 degrees, as it is shown by lines 124 in FIG. 15. The grooves 120 are cut in a well known manner for example by tilting the upper surface 121 with respect to the plane in which the abrasive wheel operates. Each pair of adjacent grooves or notches 120 forms a pair of confronting magnetic poles 122 which poles in turn define a transducing gap 126 therebetween. In this embodient the width k of transducing gap 126 is defined by the spacing of adjacent grooves 120. Each pair of grooves 120 is spaced from an adjacent pair to form lands 121 providing sufficient space for a cutting tool, such as a saw blade (not shown), which is utilized for slicing individual transducers from the block 113, in accordance with further method steps.

One or more thusly obtained grooved blocks 113 of FIG. 15 are inserted into a suitable fixture such as shown at 128 in FIG. 16. Blocks 113 are inserted therein having grooves 120 facing upwards as shown in FIG. 16. The preferred embodiment of a fixture 128 shown in FIG. 16 is similar to fixture 24 previously described and shown in FIG. 2 and is made preferably by machining as previously described. To avoid undue repetition of the disclosure only those portions of the fixture 128 and related method steps of filling the groves 120 which are different from those previously described will be described here with reference to FIG. 16. The bottom portion 130 of fixture 128 is provided with one or more grooves 132 which are formed to snuggly accommodate one or more grooved blocks 113. The latter blocks 113 are inserted in groove 132 betweeen corresponding pressure blocks 134, 135, arranged at each side of block 113 in parallel with the transducing gap plane 116, 118. A pressure screw 136 located in the botom portion 130 of fixture 128 is utilized to apply a suitable pressure on blocks 134, 135 during the glass filling process to hold the respective blocks 110, 112 together, thereby preventing them from separating due to heat.

A first pair of confronting grooves 138 is provided in portion 130 to accommodate glass strips 139 which may be of the same type as the previously described glass strip 38 of FIG. 2. Pressure blocks 134, 135 have longitudinal grooves 133, 137 provided therein along their respective sides which are in contact with the notched blocks 113. The latter grooves are used to accommodate excess glass flow. It will be noted that a front portion of the bottom fixture 130 is broken away for better clarity of representation.

An upper portion 142 of fixture 128 comprises a block 144 having a serrated lower surface 146 similar to surface 36 of block 34 of FIG. 2. A plate 148 representing load similar to plate 32 of FIG. 2 is arranged on the top surface of 150 of block 144. Preferably the serrations of surface 146 are provided in a manner previously described with reference to FIGS. 2 and 2A, while the longitudinal direction of serrations 146 extends in parallel with the longitudinal direction of grooves 120 when blocks 113 are inserted into assembled fixture 128. It is noted that alternative forms of serrations may be utilized in accordance with the foregoing disclosure.

With further reference to FIG. 16 the respective surfaces of fixture 128 which are made of stainless steel and will be in contact with glass are preferably coated with a high temperature grease as previously mentioned with respect to fixture 24 of FIG. 2. Thereafter one or more notched blocks 113 are inserted into groove 132 of fixture 128 between pressure blocks 134, 135 as previously described. The pressure screw 136 is then tightened to apply a necessary pressure on blocks 113 to hold them together during the glass filling step.

Glass strips 139 are inserted into grooves 138 in intimate contact with the grooved top surface 121 of block 113. The thusly prepared bottom portion 130 of fixture 128 is then assembled with the top portion 142 in such a way that the projecting edges of serrations 146 are in contact with the glass surface 141, similarly as previously described with reference to FIG. 2. The assembled fixture 128 is then heated, as described previously with reference to the method step of FIG. 2, above the softening temperature of the glass 139 but below the melting temperature thereof.

FIG. 17 shows a resulting glass filled block 113 following the step of removing excess glass by lapping and polishing the surfaces of block 113. The block 113 is then sliced through the glass filled notches 120 as shown by parallel lines 152 to obtain a plurality of individual transducers 154 in a similar manner as above described with reference to FIG. 5. Each resulting transducer 154 has two corresponding glass filled notches or pockets 156, 158, each extending on one side of the transducing gap 126 and defining a width k thereof as best shown in FIG. 18. The width w of transducer 154 is then reduced by lapping in a well known manner at opposite lateral surfaces 160, 162 to obtain a final desired width w' thereof as shown in FIG. 18. Each thusly obtained transducer 154 may then be contoured utilizing conventional contouring techniques. During the contouring step in the preferred embodiment of FIG. 18 a top layer is removed from the transducer-to-medium surface 166 to remove a portion of the glass filled chamfered notches 120 thereby reducing the amount of glass material in the transducer-to-magnetic medium interface area.

From the foregoing disclosure follows that the latter transducer embodiment which is made in accordance with the above-described postfilling method of the present invention besides having the advantage of filling the notches at relatively low temperature also has the advantage of having coplanar notches precisely defining the transducing gap width by obtaining zero misalignment between the corresponding pole pieces.

The alternative embodiment shown in FIGS. 19 and 20 differs from the above described embodiment of FIGS. 13 to 18, in that the chamfered notches 170 extending across the bonded magnetic blocks 176, 178 are spaced further apart to allow adjacent cutting lines 174 to extend alternatively through the filled notches and therebetween, respectively, as shown in FIG. 19. Other method steps utilized in manufacturing the resulting transducer 182 of FIG. 20, such as preparing corresponding magnetic blocks 176, 178; forming the transducing gaps, for example by glass bonding at gap plane 180; forming notches 170 at an acute chamfered angle B with respect to the top surface 181 and filling subsequently the chamfered notches 170 with a high temperature glass or other suitable nonmagnetic, electrically nonconductive material having a hardness and viscosity comparable to those of glasses, are similar to the previously described method steps with reference to FIGS. 13 to 18 and consequently will not be repeated here.

As it is seen from FIG. 19 the transducer structure 182 has a transducing gap width r which is defined on one side by the glass filled notch 170 and on the other side by the lateral surface 184 of the transducer, opposite to notch 170.

The transducer 182 obtained by the above described slicing step is then further lapped at opposite lateral surfaces 184, 186 by which step the gap width r may be reduced to a desired resulting width r' as shown in FIG. 20. The transducer 182 may be contoured to remove a layer of material at the transducer-to-recording medium surface 188 thereby reducing the glass content thereof to obtain a resulting surface 188 such as shown in FIG. 20.

As a further postfilled embodiment of the invention a transducer 190 is shown in FIG. 21. It differs from the embodiment of FIG. 20 by having a glass filled notch having a uniform depth relative to a flat transducer-to-medium surface 192 extending in parallel therewith. The latter feature allows contouring the surface 192 to obtain a desired transducer contour while the magnetic medium contacting surface of the nonmagnetic material remains substantially the same after the contouring step. It will become apparent from the foregoing disclosue that the method of manufacturing the transducer 190 is similar to that described and shown in FIGS. 19 and 20 with the exception of cutting parallel grooves or notches corresponding to 170 of FIG. 19 having a bottom portion extending substantially in parallel with the top surface of bonded magnetic blocks such as blocks 172 of FIG. 19.

FIGS. 22 to 26 show further alternative post filling method steps related to making multichannel transducer embodiments in accordance with the present invention. In FIG. 22 three composite blocks 200, 202, 204 are shown. Each composite block has a structure similar to that of block 13 of FIG. 14 in that each block defines a transducing gap plane 201, 203, 205, respectively and it has a longitudinal groove 210, 212, 214 respectively formed therein to provide winding windows. The respective materials and method steps utilized in making the blocks 200, 202 and 204 are similar to those previously described with reference to block 113. The transducing gaps 201, 203, and 205 are preferably made by first sputtering the corresponding surfaces with glass, for example Corning Glass No. 9741, and bonding together at approximately 720° C. The blocks 200, 202 and 204 are then lapped flat at confronting surfaces 220 and 221 and the latter surfaces are preferably sputtered with glass, for example Corning Glass No. 7075 having a bonding temperature approximately 500° C., that is lower than the transducing gap forming glass. The thusly prepared blocks 200, 202 and 204 are assembled side-by-side perferably with well known electromagnetic shields and/or spacers 206 and 208 arranged between adjacent blocks to reduce crosstalk between adjacent channels. The assembled blocks 200, 202, 204 and shields and spacers are held in a suitable fixture (not shown) and glass bonded together at approximately 500° in a manner well known in the art. The resulting assembly 228 is then removed from the bonding fixture and parallel longitudinal notches, also referred to as slots or grooves 222 are cut therein inwardly of an upper surface 224, at an acute angle C with reference to a longitudinal edge 226 of the assembly 228. The notches 222 are spaced to precisely define a transducing gap width d of the resulting multichannel transducer 230, 231 and 232, respectively. The depth of grooves 222 is for example 0.01 inch and their width 0.025 inch. Preferably when cutting notches 222 the transducing gap planes 210, 212, 214 are utilzied as a reference. The notched assembly 228 shown in FIG. 23 is then filled preferably with a high temperature glass as shown by interrupted lines 251 in FIG. 23, utilizing the previously described method with reference to FIG. 16. After the glass filling step the assembly 228 is cut across the glass filled notches 222 preferably along lines 232 parallel with the edge 226 of assembly 228, utilizing a slicing technique similar to those plreviously described. The thusly obtained multichannel transducer 230 shown in FIG. 24 is then lapped and polished along lateral planes 233, 234 to obtain a desired width w' of the multichannel transducer structure 230. The resulting multichannel transducer may then be contoured in a well known manner to obtain a desired transducer-to-medium surface 235 as shown in FIG. 24. It is seen from FIG. 24 that the resulting multichannel transducing assembly 230, has three precisely parallel transducing channels, each provided by a transducing gap 231 to 233 having a width d, respectively, which width is substantially reduced with respect to the transducer width w'. Thereafter respective transducing windings (not shown) are wound around each respective transducer, each winding extending through a winding window 210, 212, 214, respectively, in a known manner.

FIG. 27 shows a magnetic tape 240 having a direction of longitudinal movement indicated by arrow 241, corresponding to a relative movement with respect to the multichannel transducer 230 of FIG. 24. For example, when tape 240 is moving relatively in perpendicular with respect to the gap planes 201, 203, 205 such as known from longitudinal recording, parallel recording tracks such as shown at 242 to 244 are obtained on tape 240, corresponding to the parallel channels 231 to 233 of assembly 230. For example when utilizing a well known helical recording format, the direction of tracks 242 to 244 will extend at a relatively small angle with respect to arrow 241 as well known in the art.

Alternatively, parallel notches such as shown at 250 in FIG. 25 may be provided in a composite block 251 corresponding to block 228 of FIG. 23. As different from the embodiment of FIG. 23, notches 250 are cut in a longitudinal direction perpendicular to the gap planes 210, 212, 214. The notches 250 are then filled preferably with a high temperature glass as previously disclosed with reference to the postfilling method. The thusly obtained structure 251 is then sliced along parallel lines 252 extending through the glass pockets 250 in perpendicular with respect to the gap planes 210, 212, 214. The resulting multichannel transducer 253 shown in FIG. 26 has respective transducing gaps 254 to 256 extending side-by-side and aligned in a direction perpendicular to the above-indicated gap planes. To obtain separate recording tracks provided by the respective gaps 254 to 256, on an associated recording medium, such as shown at 242 to 244 on tape 240 of FIG. 27, a relative longitudinal movement of that tape in the direction of arrow 241 may extend at an angle such of C with respect to a longitudinal edge 257 of the multichannel transducer 253, that is at an angle C+90° with respect to the transducing gap planes 201, 203, 205, where the measure of angle C may correspond to that shown in FIG. 23. It will be understood that instead of utilizing three composite blocks, such as 200, 202, and 204 of FIG. 22, just two such blocks may be utilized to obtain a two channel transducer assembly or alternatively, four or more composite blocks to provide a multichannel transducer assembly having four or more parallel channels, respectively.

While particular examples have been given in the above description with reference to both prefilling and postfilling methods of the present invention in which examples preferably high temperature glasses are utilized for filling the track width reducing notches, it is noted that the present invention is not limited to these examples. In some magnetic recording and reproducing applications it may be desirable to fill the notches with low temperature glasses or other suitable nonmagnetic, electrically insulating materials. In the latter applications these low temperature glasses or other suitable alternative materials may be utilized instead of the previously described high temperature glasses in accordance with the teachings of this invention. There is a significant advantage when utilizing the present invention with any suitable nonmagnetic material utilized to fill the track width reducing notches that such selected material may be flown into the notches at a significantly lower temperature and thus significantly higher viscosity thereof than it is made possible by the known prior art methods. For example when utilizing the method of the notches at a temperature which is at or above their softening point but below their melting point. It is well known that generally this latter group of glasses has a relatively high content of lead which in turn may effect undesirable chemical reactions with the magnetic material utilized. The higher is the temperature at which filling of the notches takes place the higher is the possibility of such reaction. Consequently, reduction of the temperature utilized by the method of the invention reduces possible damage to the magnetic material when low temperature glasses are utilized.

It will be appreciated from the foregoing disclosure that when utilizing the postfilling method of this invention to obtain single channel or multichannel transducers there is an important advantage that coplanar notches are provided to define the transducing gap width, that is, the confronting pole pieces have a zero misalignment in the direction of the gap width, regardless of the particular type of the nonmagnetic material utilized for filling the notches.

In addition to the various preferred and alternative embodiments of the present invention, it has been discovered with respect to both prefilling and postfilling methods of the invention that the temperature utilized for filling the notches with nonmagnetic material may be even further reduced by reducing the surface of the nonmagnetic material which is in contact with the serrated surface of the fixture. As an example, FIG. 28 shows a fragmentary view of the assembled fixture 24, corresponding to that previously described and shown in FIG. 3 with the following differences. In FIG. 28 a strip 260 is utilized, instead of strip 38 of FIG. 3. Strip 260 has one long relatively narrow lateral surface 261 in contact with the notched top surface 16 of block 10 and extending across the notches 12 and the other surface 262 opposite to surface 260 in contact with serrations 37 of fixture 24. It has been discovered that when utilizing the same type of glass for strip 260 as previously described with respect to strip 38, a further reduction of temperature for the glass filling step has been obtained by approximately 50° C. More particularly, the assembled fixture 24 as shown in FIG. 2 but having glass strip 260 inserted therein as shown in FIG. 28 has been placed in the oven having the same conditions as previously discribed but a temperature rising to a reduced temperature 700° C. After reaching 700° C. the oven has been turned off and when the temperature fell to approximately 200° C. the assembled fixture has been removed therefrom. Besides utilizing a lower temperature and shorter time period for filling the notches the resulting filled notches also had a substantially reduced content of gas bubbles. It is believed that the above-indicated improve ments result from a further increase of concentrated pressure applied to a reduced surface area of the glass material while the glass entering the notches has a still higher viscosity.

It will be understood that in the latter as well as in the other above-described embodiments of the invention the weight applied to the nonmagnetic material during filling of the notches as well as the number of serrations per contact surface area have been determined empirically for the particular type of the nonmangetic material utilized.

While the invention has been particularly shown and described with reference to embodiments thereof, it will be appreciated that various alternatives and modifications may be made which will fall within the scope of the appended claims.

What is claimed is:

1. An apparatus for filling notches provided in a notched workpiece with a soft filler material having a viscosity similar to glasses, comprising:
    a bottom portion having a groove for receiving and holding a workpiece having a notched top surface; and
    a top portion having a lower surface cooperating with said bottom portion and having at least one discrete location for applying a concentrated pressure to said soft filler material, said lower surface being positioned outside said notches in said workpiece when said workpiece is inserted in said groove, to enhance flow of said soft filler material into said notches when said top portion is assembled with said bottom portion with said soft filler material disposed therebetween.

2. The apparatus of claim 1 wherein said top portion has a serrated lower surface.

3. The apparatus of claim 2 wherein said serrated lower surface comprises a plurality of serrations having triangular cross sections.

4. The apparatus of claim 2 wherein said top portion is provided in the form of a plate having a selected weight substantially evenly distributed over said lower surface thereof.

5. The apparatus of claim 2 wherein said serrated lower surface comprises a plurality of serrations extending in a longitudinal direction parallel with that of said notches.

6. The apparatus of claim 1 wherein said bottom portion further comprises confronting grooves for receiving a strip of said soft filler material disposed across said notches with a planar surface of said strip being in intimate contact with said notches.

7. The apparatus of claim 1 wherein said bottom portion further comprises confronting grooves for receiving a strip of said soft filler material disposed across said notches with a lateral surface of said strip having a width substantially smaller than a planar surface thereof and being in intimate contact with said notches.

8. The apparatus of claim 1 wherein both said bottom and top portions are made of graphite.

9. The apparatus of claim 1 wherein both said bottom and top portions are made of stainless steel.

10. The apparatus of claim 1 wherein said bottom portion has a first set of grooves to snugly accommodate a plurality of workpieces.

11. An apparatus for filling a notched block of magnetic core material with a soft filler material having a viscosity similar to glasses, comprising:
    a bottom portion having at least one groove for receiving and holding at least one block of a magnetic transducer core material having a notched top surface; and
    a top portion cooperating with said bottom portion and having a serrated lower surface and a top surface having a selected weight substantially evenly distributed over said serrated lower surface, said serrated lower surface applying a concentrated pressure to said soft filler material and being positioned outside said notches in said block when said block is inserted in said groove and said top portion is assembled with said bottom portion with said soft filler material disposed therebetween, to enhance flow of said soft filler material into said notches.

12. The apparatus of claim 11 wherein said bottom portion further has a groove for receiving a strip of said soft filler material interposed between and in contact with both said notched top surface and said serrated lower surface.

13. The apparatus of claim 11 wherein said bottom portion is adapted to receive a composite block of said magnetic transducer core material defining a transducing gap plane, and wherein said apparatus further comprises pressure blocks arranged on opposite sides of said groove for receiving said composite block and a pressure screw attached to said pressure blocks for applying a selected pressure to said composite block in a direction substantially normal to said transducing gap plane.

14. The apparatus of claim 13 wherein said pressure blocks have a longitudinal groove provided therein, adjacent to said composite block and in a direction of said transducing gap plane to accommodate flow of an excess of said soft filler material.

15. The apparatus of claim 11 wherein said bottom portion further has at least one longitudinal groove provided therein in parallel with and adjacent to said groove for receiving and holding said block of a magnetic transducer core material to accommodate flow of an excess of said filler material.

* * * * *

UNITED STATES PATENT AND TRADEMARK OFFICE
CERTIFICATE OF CORRECTION

PATENT NO.  :  4,732,600
DATED       :  March 22, 1988
INVENTOR(S) :  Edward Schiller It is certified that error appears in the above-identified patent and that said Letters Patent is hereby corrected as shown below:

Column 4, line 41, "glasss" should read --glass--;

Column 8, line 8, "transduercs" should read --transducers;--

Column 11, line 31, "utilzied" should read --utilized--;

Column 11, line 39, "plreviously" should read --previously--;

Column 12, line 53, after "the" insert --invention with low temperature glasses these are flown into the--;

Column 13, line 47, "nonmangetic" should read --nonmagnetic--.

Signed and Sealed this

Seventeenth Day of January, 1989

*Attest:*

DONALD J. QUIGG

*Attesting Officer*    Commissioner of Patents and Trademarks